United States Patent [19]
Adam et al.

[11] Patent Number: 4,643,040
[45] Date of Patent: Feb. 17, 1987

[54] WORM GEAR TRAIN ARRANGEMENT AND HOUSING

[75] Inventors: Peter Adam, Hoechberg; Wolfram Knappe, Kitzingen, both of Fed. Rep. of Germany

[73] Assignee: Siemens Aktiengesellschaft, Munich and Berlin, Fed. Rep. of Germany

[21] Appl. No.: 763,351

[22] Filed: Aug. 7, 1985

[30] Foreign Application Priority Data

Aug. 8, 1984 [DE] Fed. Rep. of Germany ....... 3429249

[51] Int. Cl.$^4$ .............................................. F16H 1/18
[52] U.S. Cl. ...................... 74/425; 49/348; 49/349; 403/267
[58] Field of Search ........................ 403/265, 267, 359; 49/346, 349, 350, 351, 352, 353; 74/425, 89.14

[56] References Cited

U.S. PATENT DOCUMENTS 4,367,660 1/1983 Becker et al. ...................... 74/425 X
4,428,250 1/1984 Becker et al. ........................... 74/425

FOREIGN PATENT DOCUMENTS 2809166 9/1979 Fed. Rep. of Germany ........ 74/425
3133652 4/1982 Fed. Rep. of Germany .
2532983 3/1984 France ................... 49/348
2057627 4/1981 United Kingdom .

Primary Examiner—Dave W. Arola
Attorney, Agent, or Firm—F. W. Powers; J. L. James

[57] ABSTRACT

The object of the invention is to develop an easily fabricated and assembled gear train arrangement, specifically a worm gear arrangement, which requires only a low overall height and at the same time assures operating reliability under extreme temperature ranges for application is motorized vehicle accessory drives such as power window lifts, wherein an output shaft mounted in a gear housing is linked in an elastic, slightly rotating connection to a worm wheel by way of a catch plate fastened to the output shaft, with the worm wheel being driven by a worm gear drive shaft which penetrates into the gear housing. In accordance with this invention the catch plate is designed as a single-piece plastic injection molding mounted onto the output shaft, with a first bearing bushing to mount the output shaft in the gear housing and a second bearing bushing mounted concentrically to the first bearing bushing to mount the worm wheel on the catch plate.

12 Claims, 2 Drawing Figures

WORM GEAR TRAIN ARRANGEMENT AND HOUSING

BACKGROUND OF THE INVENTION

This invention relates to a gear train arrangement, particularly a worm gear arrangement having a worm wheel elastically mounted on a catch plate driving in turn an output shaft which can be used among other things to provide a lift drive mechanism for automobile windows.

In a known worm gear arrangement utilized in a motor vehicle window-lifter drive, a separate, metallic catch plate is fit-mounted and fastened. It is mounted on the end of the steel output shaft facing away from the output side, which is mounted in the gear housing using standard sintered sleeve bearings. Concentric to the output shaft around the circumference of the catch plate are projecting pins attached in an axially free-standing fashion which mesh - when the gear train is assembled - with corresponding pockets distributed around the circumference of the worm wheel. To avoid gear damage, for example, when the catch plate reaches a stop when attaining the upper or lower end position due to the action of the motorized window-lifter drive, damping buffers of elastic material are slipped over the pins; to permit the required relative motion between the catch plate on the one hand and the worm wheel on the other, the worm wheel is mounted in a rotating fashion on the output shaft, specifically axially between the sintered bearings for the actual sleeve bearing of the drive shaft in the gear housing.

It is the object of this invention to develop a design assuring higher operating reliability for the gear train, particularly considering the extensive operating temperature ranges when utilized as part of a motor vehicle window-lifter drive. It is a further object of this invention to provide a design permitting less overall height in the direction of the output shaft and simpler manufacture and assembly engineering.

SUMMARY OF THE INVENTION

In accordance with one aspect of the invention, the aforementioned objects are achieved by providing a worm gear train arrangement, with a gear housing and a bearing-mounted output shaft in the housing. A catch plate is concentrically attached to the output shaft. This catch plate is formed out of a single piece of plastic and is attached to the output shaft by an injection molding process. The catch plate is provided with a first bearing bushing for mounting the output shaft in the gear housing, and a second bearing bushing located concentrically to the first bearing bushing. Connected by an elastic rotating linkage to the catch plate is the worm wheel. The worm wheel also is mounted by the second bearing bushing of the catch plate. A worm gear extends into the housing and engages the worm wheel. The worm gear drives the worm wheel, which by the elastic linkage turns the catch plate, which further turns the attached output drive shaft.

In the gear train design, according to this invention, the worm wheel is no longer bearing-mounted axially before the bearing points of the drive shaft in the gear housing, but rather bearing-mounted concentrically around said bearing points and at a radial space from the output shaft on the second bearing sleeve of the single-unit catch plate, the structural height of the gear train in the direction of the output shaft can be substantially reduced, which at the same time produces a more favorable bearing mount of the worm wheel in terms of the load factors radially beneath the meshing point of the drive shaft. A further design simplification is produced simultaneously by the fact that between the worm wheel and its supporting portion there is no constant relative sliding motion, but merely a slight relative rotation between the worm wheel and the second bearing sleeve which needs to be considered in case, due to an excessively hard contact at the end stop, the elastic damping elements between the catch plate and worm wheel will be slightly compressed for a short period. Even if due to the required strength parameters, the output shaft has to be made of steel, all other components, e.g., catch plate, worm wheel and bearing elements, which are designed as plug-in components in the simplest possible fashion, can be fabricated of plastic. Thus, due to the very limited steel component and small diameter of the output shaft, loads due to excessive heat generation by metal components can be avoided.

Due to the location of the first and second output shaft bearing bushings and the first and second axially open bearing bushings, the design assures a particularly simple casting fabrication and plug-in assembly of the individual gear components which can be assembled with minimally required structural height. To assure a particularly solid catch connection between the output shaft and the injection-moulded catch plate, one embodiment of the invention provides for the output shaft in the area of the first bearing bushing having axial and/or tangentially positioned exterior keyways, thus assuring an additional locking connection between the injection-moulded plastic of the catch plate and the output shaft.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
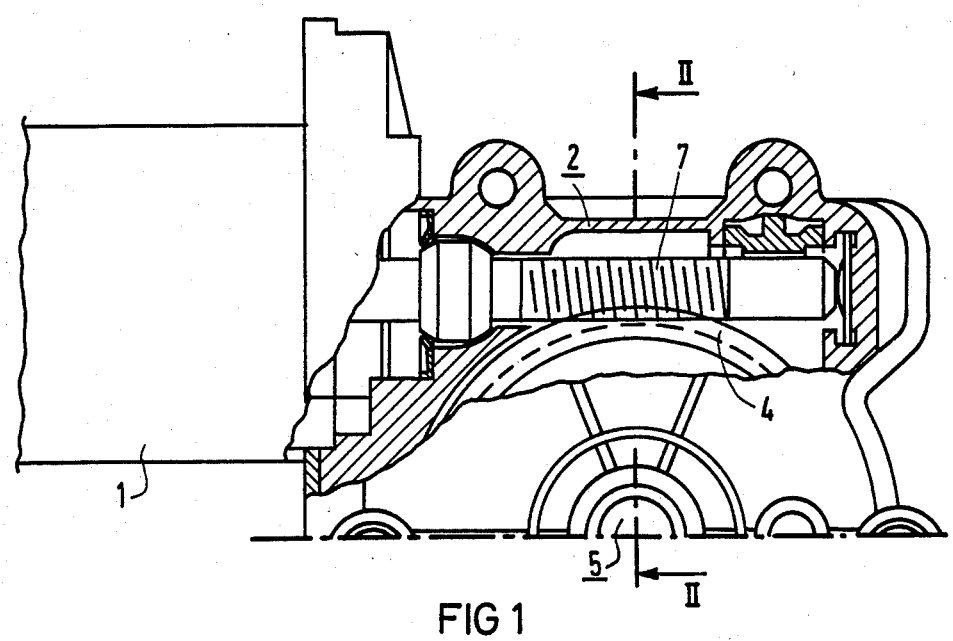
FIG. 1 illustrates an application of the invention as a motor vehicle window-lifter drive shown in an axial/-longitudinal partial sectional view.
Figure 2:
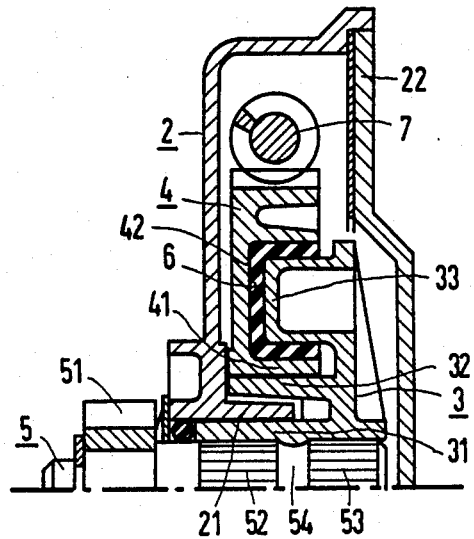
FIG. 2 is a sectional view through the gear housing of the gear drive shown in FIG. 1 along section II—II.

In an axial-longitudinal partial sectional view, FIG. 1 shows an embodiment of the invention which could be used as motor vehicle window-lifter drive with an only schematically indicated d.c. drive motor 1 whose extended rotor shaft penetrates with the attached worm gear drive shaft 7 into a pot-shaped gear housing 2 which can be closed with a gear housing cover 22 and which is flange-mounted to the housing of d.c. drive motor 1. Drive shaft 7 drives worm wheel 4.

Axially projecting pins 33 of a catch plate 3 made of plastic mesh with corresponding axially open pockets 42 formed and distributed around the circumference of worm wheel 4. Catch plate 3 is injection-molded over a first bearing sleeve 31 directly onto an output shaft 5. For better linkage between the catch plate 3 on the one hand and output shaft 5 on the other, its surface is fitted with axially positioned keyways 52, 53 and/or tangentially positioned keyways 54. Between the axially projecting pins 33 of the catch plate 3 and the axially meshing open pockets 42, hat-shaped damping buffers 6 are inserted over pins 33 in an inverted fashion prior to assembly.

The output shaft equipped with an output worm wheel 51 is bearing bushing mounted, via the molded-on bearing bushing 31, directly in a concentric gear housing bearing bushing 21. Worm wheel 4 with a molded-on worm wheel bearing sleeve 41 is similarly mounted in a direct rotary fashion on a second bearing sleeve 32 of the catch plate 3.

The bearing bushings 31 or 32 which are molded in one piece onto catch plate 3, are connected to the drive shaft 5 at its right end, i.e. the end facing away from the output side with the worm wheel output 51. Said bearing bushings 31 or 32 have open wall panels toward the output side, from which the corresponding facing panels of bearing bushings 21 or 41 of gear housing 2 or of the worm wheel 4 can be inserted into, thereby assuring an easily installed and space-saving gear design. It will now be understood that there has been disclosed an improved worm gear arrangement and housing designed for ease of manufacture and assembly.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A worm gear train arrangement, comprising:
   a gear housing having a hole in the center thereof;
   an output shaft;
   a catch plate, consisting of a single-piece, injection molded plastic part, having a circular shape and a hole through the center thereof;
   said output shaft being snugly fitting in said hole in said catch plate connecting said output shaft to said catch plate;
   a first bearing bushing being a part of said single-piece, injection molded plastic catch plate concentrically located to said center hole for rotatably mounting said catch plate and said output shaft in said gear housing;
   a worm wheel having a center hole therein which is concentric with said catch plate center hole;
   a second bearing bushing being a part of said single-piece, injection molded plastic catch plate concentrically located in said worm wheel center hole for slidably mounting said worm wheel thereon;
   catch means being a part of said single-piece, injection molded plastic catch plate for rotatably linking said catch plate to said worm wheel;
   an elastic rotating linkage located between said catch means and said worm wheel for elastically connecting said catch means to said worm wheel; and
   a worm gear drive extending into the housing and engaging the worm wheel to drive the wheel and via the catch plate linkage drive the output shaft.

2. A worm gear arrangement according to claim 1, further comprising:
   a third bearing bushing as a part of said gear housing surrounding said gear housing hole and extending axially in a direction away from an output end of said output shaft;
   a fourth bearing bushing as a part of said worm wheel surrounding said worm wheel center hole and extending axially in a direction away from said output end of said output shaft;
   said first and second bearing bushings are joined at one end to said catch plate and extend axially in a direction towards said output end of said output shaft;
   said second bearing bushing is inserted within and slidably mounts against said fourth bearing bushing; and
   said first bearing bushing is inserted within and slidably mounts against said third bearing bushing.

3. A worm gear train arrangement according to claim 2, wherein the output shaft is provided in the area of the catch plate center hole with axial oriented keyways.

4. A worm gear train arrangement according to claim 3, wherein the output shaft is made of steel and the worm wheel is made of plastic.

5. A worm gear train arrangement according to claim 2, wherein the output shaft is provided in the area of the catch plate center hole with tangential oriented keyways.

6. A worm gear train arrangement according to claim 5, wherein the output shaft is made of steel and the worm wheel is made of plastic.

7. A worm gear train arrangement according to claim 2, wherein the output shaft is made of steel and the worm wheel is made of plastic.

8. A worm gear train arrangement according to claim 1, wherein the output shaft is provided in the area of the catch plate center hole with axial oriented keyways.

9. A worm gear train arrangement according to claim 8, wherein the output shaft is made of steel and the worm wheel is made of plastic.

10. A worm gear train arrangement according to claim 1, wherein the output shaft is provided in the area of the catch plate center hole with tangential oriented keyways.

11. A worm gear train arrangement according to claim 10, wherein the output shaft is made of steel and the worm wheel is made of plastic.

12. A worm gear train arrangement according to claim 1, wherein the output shaft is made of steel and the worm wheel is made of plastic.

* * * * *